(12) United States Patent
Trapani

(10) Patent No.: US 12,554,827 B2
(45) Date of Patent: *Feb. 17, 2026

(54) WIRELESS SHARED OMNIBUS ACCESS CONTROL METHOD AND SYSTEM

(71) Applicant: Security Enhancement Systems, LLC, Northbrook, IL (US)

(72) Inventor: Matthew Frank Trapani, Deerfield, IL (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 47 days.

This patent is subject to a terminal disclaimer.

(21) Appl. No.: 18/680,358

(22) Filed: May 31, 2024

(65) Prior Publication Data
US 2024/0394356 A1 Nov. 28, 2024

Related U.S. Application Data

(63) Continuation of application No. 17/709,201, filed on Mar. 30, 2022, now Pat. No. 12,039,030.

(60) Provisional application No. 63/168,190, filed on Mar. 30, 2021.

(51) Int. Cl.
*G06F 21/44* (2013.01)
*H04L 9/40* (2022.01)
(52) U.S. Cl.
CPC ............ *G06F 21/44* (2013.01); *H04L 63/102* (2013.01)

(58) Field of Classification Search
CPC ... G06F 21/34; H04L 63/105; H04L 63/1408; H04L 63/20; H04W 12/082
See application file for complete search history.

(56) References Cited

U.S. PATENT DOCUMENTS

| | | | | |
|---|---|---|---|---|
| 10,942,991 | B1* | 3/2021 | Kidd | G06F 16/954 |
| 12,039,030 | B2* | 7/2024 | Trapani | G06F 21/34 |
| 2013/0339400 | A1* | 12/2013 | Pflughoeft | G06Q 10/101 |
| | | | | 707/803 |
| 2014/0215595 | A1* | 7/2014 | Prasad | G06F 21/41 |
| | | | | 726/8 |
| 2019/0273744 | A1* | 9/2019 | Goel | G06F 9/468 |
| 2020/0358765 | A1* | 11/2020 | Olsen | H04L 63/0428 |
| 2021/0099301 | A1* | 4/2021 | Busjaeger | G06F 16/9035 |
| 2021/0392142 | A1* | 12/2021 | Stephens | H04L 63/104 |
| 2022/0058903 | A1* | 2/2022 | Johnson | G07C 9/00309 |

* cited by examiner

*Primary Examiner* — Beemnet W Dada
(74) *Attorney, Agent, or Firm* — Gregory Finch; Finch Paolino, LLC

(57) ABSTRACT

An owner-tenant wireless shared omnibus access control system configured to enable owners and tenant users of an electronic access control system to seamlessly access a lock that is shared between remote site owners and one or more tenants, while maintaining access control and audit trail with minimal administrative overhead. An owner-tenant wireless shared omnibus access control system may be operably configured to enable expanded or limited access and audit trail information based on different user roles and permissions comprising an owner user and a tenant user.

20 Claims, 8 Drawing Sheets

WIRELESS SHARED OMNIBUS ACCESS CONTROL METHOD AND SYSTEM

CROSS-REFERENCE TO RELATED APPLICATIONS

The present application is a continuation of U.S. patent application Ser. No. 17/709,201, filed on Mar. 30, 2022, and entitled "WIRELESS SHARED OMNIBUS ACCESS CONTROL METHOD FOR ELECTRONIC ACCESS CONTROL SYSTEMS"; said application claiming the benefit of U.S. Provisional Application Ser. No. 63/168,190, filed on Mar. 30, 2021, and entitled "WIRELESS SHARED OMNIBUS ACCESS CONTROL METHOD FOR ELECTRONIC ACCESS CONTROL SYSTEMS"; the entireties of said applications being incorporated herein at least by virtue of this reference.

FIELD

The present disclosure relates to the field of electronic access control systems; in particular, an owner-tenant wireless shared omnibus access control system and method for use within electronic access control systems.

BACKGROUND

Various access control systems are utilized to restrict access to secure locations for various safety and security reasons. There are many situations in which users of an access control system, such as field technicians, need to access a secure location in order to service equipment and/or perform various activities. Such locations may include, for example, cell towers, rail cabinets, transportation containers and many other areas that maintain infrastructure operations. Many of these sites utilize various types of electronic access control (EAC) applications and locks to provide and restrict access to the site so that access can be controlled and monitored while improving security and operational efficiencies. In various real-world use cases, a single site may include multiple types/makes of EAC equipment associated with multiple EAC system owners and tenants.

While EAC systems provide many operational efficiencies and advantages over mechanical locks, a problem is that for access-controlled sites comprising multiple types/makes of EAC equipment securing multiple access points, each EAC system owner and/or tenant system requires different credentials and can become problematic when access credentials need to be shared across different users for different systems. These credentials can be, for example, smartphone, tablet, and mobile electronic device-based applications. In such cases, an individual user will often need to download, configure and utilize a variety of disparate applications to enable electronic access controls across each owner or tenant system at one or more sites.

Through applied effort, ingenuity, and innovation, Applicant has identified a number of deficiencies and problems with shared access methods in electronic access control systems. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Certain aspects of the present disclosure provide for an owner-tenant wireless shared omnibus access control system configured to enable owners and tenant users of an electronic access control system to seamlessly access a lock that is shared between remote site owners and one or more tenants, while maintaining access control and audit trail with minimal administrative overhead. The owner-tenant wireless shared omnibus access control system of the present disclosure may be implemented with a variety of wirelessly controlled electronic locking devices including, but not limited to, wireless electronic gate locks, puck locks, blocker-secured cabinets/generators/shrouds, 5G poles, door lock secured shelters and the like.

An object of the present disclosure is to provide for an owner-tenant wireless shared omnibus access control system configured to enable expanded or limited access and audit trail information based on different user roles and permissions comprising an owner user and a tenant user. In accordance with certain aspects of the present disclosure, an owner user may desire to have full access rights and audit trail information for one or more non-owner users and vendors that access an access-controlled site via an electronic access control lock. The owner user may also desire to provide one or more tenant users with a single omnibus account that enables the tenant user to access the access-controlled site based on one or more configurable permissions and conditions (e.g., location, time, duration, etc.). However, in certain exemplary use cases, a tenant user may not want to share certain confidential information, such as personal identifying information, with the owner. In accordance with certain aspects of the present disclosure, an omnibus tenant account may enable the tenant user to grant access to their own employees and vendors without sharing user or system confidential information with the owner user. An audit trail for the owner user may comprise user identification and confidential access information for non-owner users within the owner user's organization and de-identifying/non-confidential access information for tenant users, such as time, high level purpose and optionally contact information and the like.

Certain aspects of the present disclosure provide for an electronic access control system, comprising one or more electronic access control devices; at least one client device associated with at least one user type; and at least one remote server communicably engaged with the one or more electronic access control devices and the at least one remote server, wherein the at least one remote server comprises at least one processor and a non-transitory computer-readable medium comprising executable computer program instructions stored thereon that, when executed, command the at least one processor to perform one or more operations, the one or more operations comprising configuring an omnibus account for a tenant user, wherein the omnibus account is configured to enable the tenant user to create one or more sub-user accounts within the omnibus account; configuring an administrator account for an owner user, wherein the administrator account is configured to enable the owner user to selectively revoke access rights and one or more permissions for the tenant user and the one or more sub-user accounts; configuring a first audit log for the tenant user, wherein the first audit log comprises access history data and user information data associated with the omnibus account; and configuring a second audit log for the owner user, wherein the second audit log comprises only the access history data associated with the omnibus account.

In accordance with certain embodiments, the omnibus account may be configured to enable the tenant user to temporarily grant access rights for the one or more electronic access control devices to one or more guest users. In accordance with certain embodiments, the one or more operations may further comprise providing a mobile application to the at least one client device, wherein the mobile application comprises a graphical user interface for configuring one or more settings of the omnibus account or the administrator account. In accordance with certain embodiments, the one or more operations may further comprise communicating one or more user credentials to the at least one client device. In accordance with certain embodiments, the administrator account may be configured to enable the owner user to configure two or more lock types for the one or more electronic access control devices. In accordance with certain aspects of the present disclosure, the two or more lock types may comprise owned locks and shared locks. In accordance with certain embodiments, the omnibus account may be configured to enable the tenant user to selectively grant access permissions to the shared locks to one or more sub-users. In accordance with certain embodiments, the administrator account may be configured to enable the owner user to selectively grant access permissions to the owned locks to one or more other users. In accordance with certain embodiments, the omnibus account may be configured to enable the tenant user to configure two or more lock types for the one or more electronic access control devices, wherein the two or more lock types comprise tenant locks and shared locks. In accordance with certain embodiments, the omnibus account may be configured to enable the tenant user to selectively grant access permissions to the tenant locks to one or more other users.

Further aspects of the present disclosure provide for an electronic access control method, comprising configuring, with at least one server, an omnibus account for a tenant user, wherein the omnibus account is configured to enable the tenant user to create one or more sub-user accounts within the omnibus account; configuring, with the at least one server, an administrator account for an owner user, wherein the administrator account is configured to enable the owner user to selectively revoke access rights and one or more permissions for the tenant user and the one or more sub-user accounts; providing, with the at least one server, a mobile application to at least one client device, wherein the mobile application comprises a graphical user interface for configuring one or more settings of the omnibus account or the administrator account; configuring, with at least one client device via the graphical user interface, one or more lock types for one or more electronic access control devices; configuring, with the at least one client device via the graphical user interface, one or more access credentials for the one or more electronic access control devices; and communicating, with the at least one server, the one or more access credentials to the one or more sub-user accounts.

Still further aspects of the present disclosure provide for a non-transitory computer-readable medium comprising executable computer program instructions stored thereon that, when executed, command at least one processor to perform one or more operations of an electronic access control method, the one or more operations comprising configuring an omnibus account for a tenant user, wherein the omnibus account is configured to enable the tenant user to create one or more sub-user accounts within the omnibus account; configuring an administrator account for an owner user, wherein the administrator account is configured to enable the owner user to selectively revoke access rights and one or more permissions for the tenant user and the one or more sub-user accounts; configuring a first audit log for the tenant user, wherein the first audit log comprises access history data and user information data associated with the omnibus account; and configuring a second audit log for the owner user, wherein the second audit log comprises only the access history data associated with the omnibus account.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
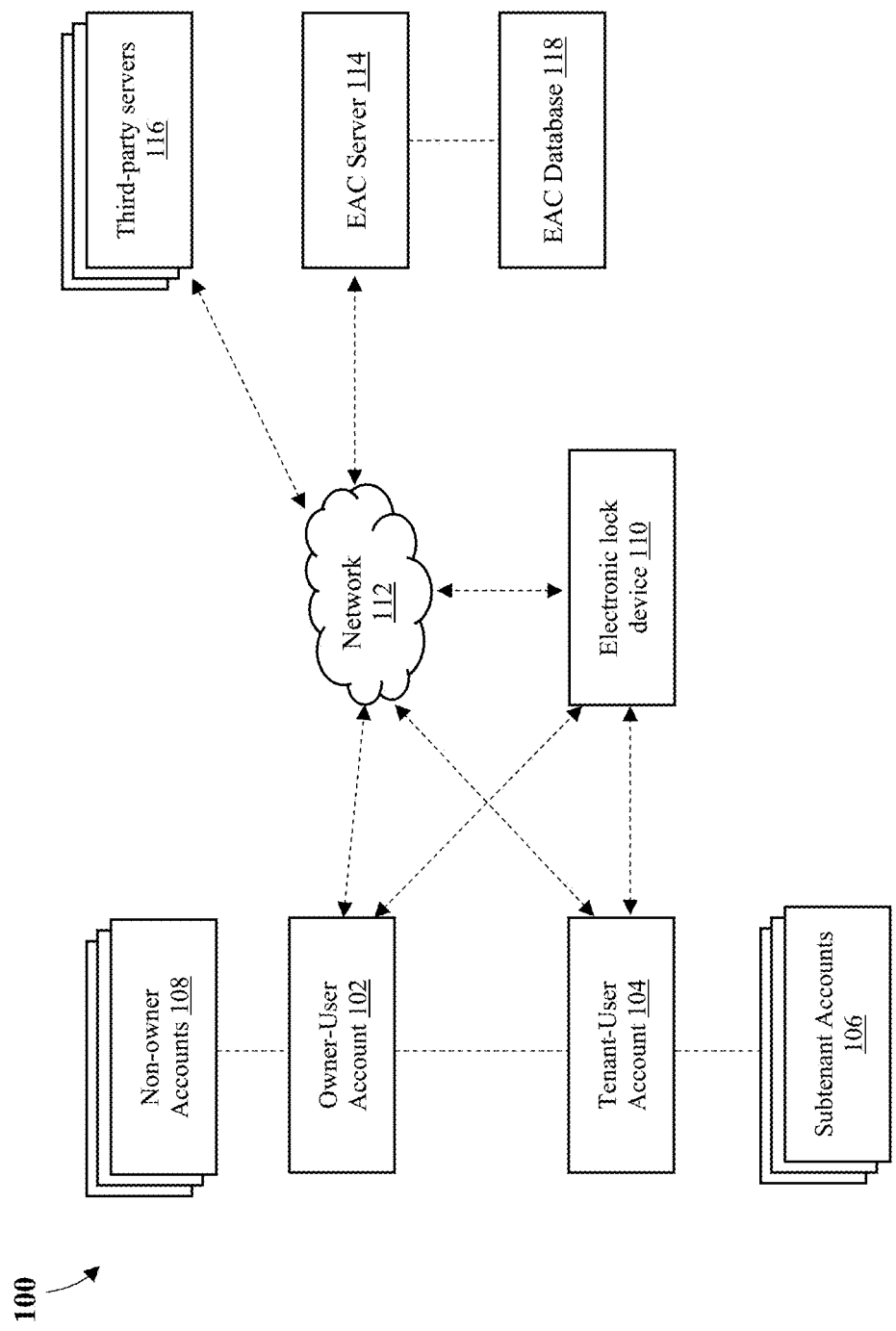
FIG. 1 is a system diagram of a shared omnibus access control system, in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

Certain benefits and advantages of the present disclosure include an owner-tenant wireless shared omnibus access control system, wherein: technicians/non-owner users can quickly access shared locks using their existing access process without having to complete additional access processes; site owners/administrators do not have to be involved with granting and revoking access to each site tenant individual once the tenant organization is set up in an application database; and site owners and tenants have different levels of visibility into access reports so that personally identifying information for tenant users is hidden from owner users, while still ensuring that owner users can track access events for a tenant user.

In accordance with certain embodiments, an owner-tenant wireless shared omnibus access control system may comprise one or more user roles, including: Owner/Administrator—a system user that has access privileges to create and edit settings and users in the owner-tenant wireless shared omnibus access control system; Tenant User—a system user that is granted sub-administrator rights by the Owner/Administrator; and Non-Owner/Technician User—a system user that uses Usernames/Passwords or PINs for a credential and is either an employee or contractor that will need to access a site for service or installation work.

Turning now descriptively to the drawings, in which similar reference characters denote similar elements throughout the several views, FIG. 1 is a system diagram of an owner-tenant wireless shared omnibus access control system 100. In accordance with certain aspects of the present disclosure, system 100 comprises an end-user application executing on a client device associated with an owner-user account 102 stored in an EAC database 118 communicably engaged with an EAC server 114. An instance of the end-user application executing on the client device associated with owner-user account 102 may establish a communications interface between owner-user account 102 and EAC server 114 via network 112. In accordance with certain aspects of the present disclosure, owner-user account 102 may be configured to enable an owner-user to configure one or more credentials and/or access permissions for an electronic lock device 110 for one or more user roles. In certain embodiments, the one or more credentials and/or access permissions may include the credential types provided in Table 1, below.

| Credential | Acct Type | # of Sites | Creation Request | Access Duration |
| --- | --- | --- | --- | --- |
| PIN | User Acct (Full user detail) | 1+ | Server (End user mobile application can request resend) | 90 days (Configurable) |
| AC | User or Guest User Acct (Minimal user detail) | 1 | End user mobile application or Server | 2, 8, 24 or 48 hours |

-continued

| Credential | Acct Type | # of Sites | Creation Request | Access Duration |
|---|---|---|---|---|
| EC | User or Guest User Acct (Minimal user detail) | 1+ | End user mobile application or Server | 1-7 days 1-4 weeks |

In accordance with certain aspects of the present disclosure, owner-user account 102 is operably configured to configured one or more of a non-owner account 108 and a tenant-user account 104. In certain embodiments, non-owner account 108 may be associated with a non-owner user (e.g., a service technician for a premises or location secured by electronic lock device 110) and tenant-user account 104 may be associated with a tenant user (e.g., a tenant of a premises or location secured by electronic lock device 110). In accordance with certain embodiments, tenant-user account 104 may be configured to enable the tenant user to configure one or more credentials and/or access permissions for electronic lock device 110 for one or more subtenant accounts 106. Subtenant accounts 106 may be associated with one or more subtenant users, such as employees or invitees of the tenant user.

In accordance with certain aspects of the present disclosure, system 100 comprises one or more routines or operations for processing a user access request from a user other than the owner user. In certain embodiments, one or more routines or operations for processing a user access request comprise creating, via the owner user account 102, a new user/guest user. In certain embodiments, the owner user can create a new credential as well as distribute a credential for an authorized user if configured to do so via email/text (PIN is optional). In certain embodiments, owner user account 102 can only store one PIN per non-owner user or tenant user. Once a new credential is created, the owner user can send a credential distribution request for a user to EAC server 114. EAC server 114 sends the credential to the user in need of access via email/text (PIN distribution is optional). In accordance with certain embodiments, another user's credential is never shared with the user that requests access for that other user. In accordance with certain embodiments, an access request must minimally have an organization, username, cell #, credential type, site (if access control) and can utilize a search field for these fields. In accordance with certain aspects of the present disclosure, owner-user account 102 and/or tenant-user account 104 may be communicably engaged with EAC server 114 via network 112 to execute one or more routines or operations for a user registration process for system 100.

Figure 2:
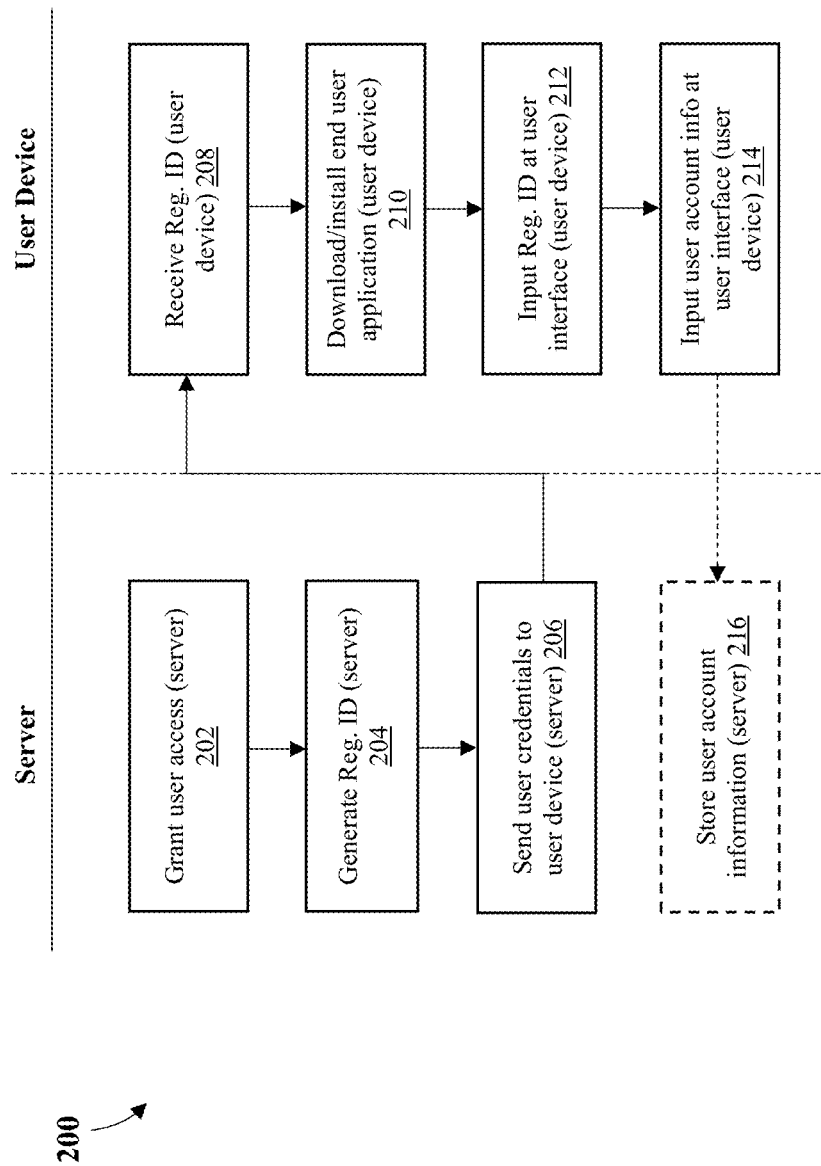
FIG. 2 is a functional block diagram of a routine of a shared omnibus access control system, in accordance with certain aspects of the present disclosure.

Referring now to FIG. 2, with cross reference to FIG. 1, a functional block diagram of a routine 200 of a shared omnibus access control system is shown. In accordance with certain aspects of the present disclosure, routine 200 comprises one or more routine of system 100, as shown in FIG. 1. In accordance with certain aspects of the present disclosure, routine 200 may comprise a routine for a registration process of one or more users of system 100 (e.g., an owner user, a tenant user, one or more sub-tenant user and/or one or more guest users). Routine 200 may comprise one or more operations for granting access to a new user at the EAC server (e.g., EAC server 114 of FIG. 1) (Block 202). The EAC server may perform one or more operations of routine 200 to generate user credentials comprising one or more of a registration ID, customer name and download instructions for the new user (Block 204). The EAC server may perform one or more operations of routine 200 to send the user credentials to a new user device; e.g., via a wireless communications network (Block 206).

In accordance with certain aspects of the present disclosure, routine 200 may continue by enabling one or more steps or operations for a user to receive the user credentials, including the registration ID, at a user device (Block 208). In accordance with certain aspects of the present disclosure, the user device may comprise a client of the server. In certain embodiments, the user device may comprise a smart phone, a tablet computer, a mobile electronic computing device, a personal computing device or workstation, and the like. In accordance with certain aspects of the present disclosure, routine 200 may continue by enabling one or more steps or operations to enable the user to download/install an end user application at the user device (Block 210). In certain embodiments, the one or more steps or operations may include scanning a machine-readable optical code or providing a link (e.g., via text message) to an application store to begin the software download. In accordance with certain aspects of the present disclosure, routine 200 may continue by enabling one or more steps or operations for the user to launch the end user application and input the user credentials (e.g., registration ID) at a graphical user interface (GUI) of the end user application (Block 212). In accordance with certain embodiments, the user credentials may comprise a user personal identification number (PIN). In certain embodiments, routine 200 may continue by enabling one or more steps or operations for the user to input certain user account information at the GUI; for example, personally identifiable information such as cell phone number, name, company and the like (Block 214). Routine 200 may conclude by performing one or more steps or operations for storing the user account information at the server (Block 216).

Figure 3A:
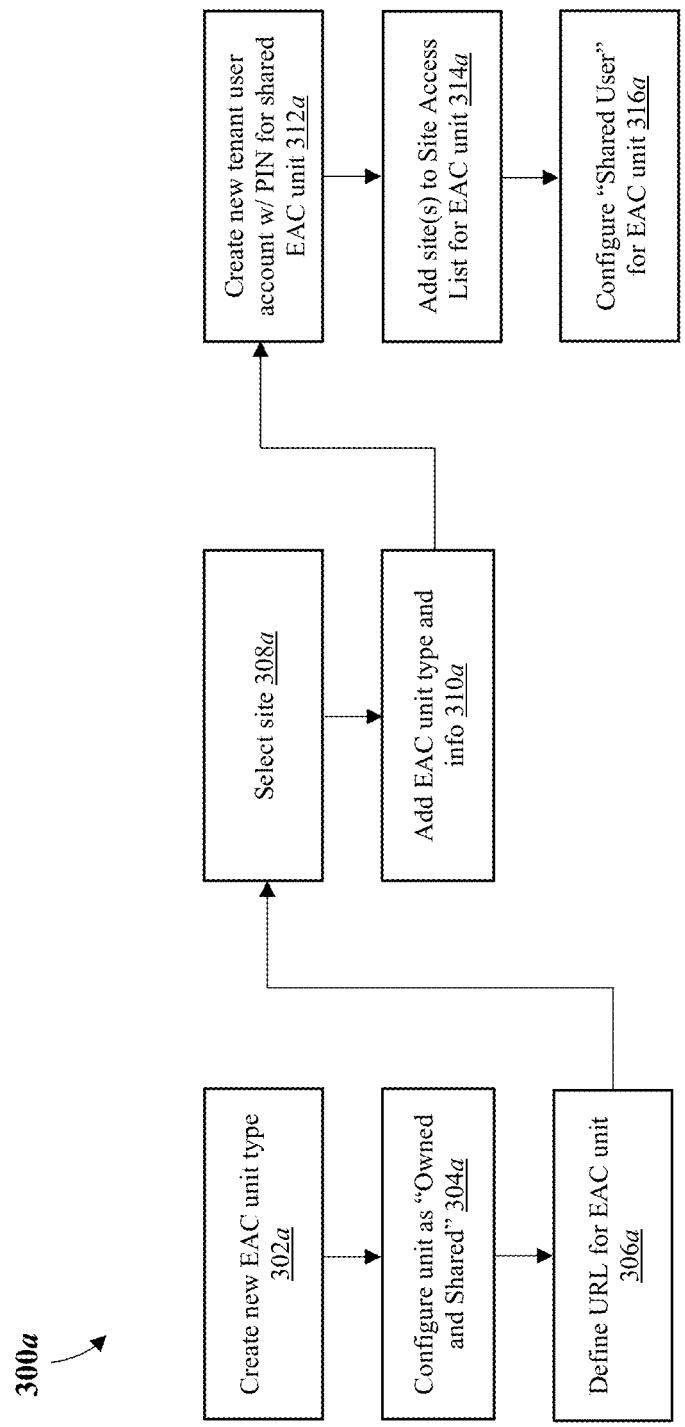
FIG. 3A is a functional block diagram of a routine of a shared omnibus access control system, in accordance with certain aspects of the present disclosure.

Referring now to FIG. 3A, with cross reference to FIG. 1, a functional block diagram of a routine 300a of a shared omnibus access control system is shown. In accordance with certain aspects of the present disclosure, routine 300a comprises one or more routine of system 100, as shown in FIG. 1. In accordance with certain aspects of the present disclosure, routine 300a may comprise one or more steps or operations to enable an owner user to configure shared access provisioning for one or more shared EAC devices (e.g., electronic lock device 110 of FIG. 1) from an owner-user account interface (e.g., owner-user account 102 of FIG. 1). In accordance with certain aspects of the present disclosure, routine 300a may comprise one or more steps or operations for creating a new EAC unit type within the owner-user account interface (Block 302a). The owner-user may perform one or more steps within routine 300a to configure a new EAC unit as an "Owned and Shared" within the owner-user account interface (Block 304a). Routine 300a may comprise one or more steps or operations for defining/assigning a uniform resource locator (URL) for the new EAC unit (Block 306a). Routine 300a may continue by enabling the owner-user to perform one or more steps within routine 300a to select a site location within the owner-user account (Block 308a) and adding the new EAC unit, including unit type and other unit information, within the account interface (Block 310a). In accordance with certain aspects of the present disclosure, routine 300a may continue by enabling the owner-user to perform one or more steps within routine 300a to create a new tenant user account and, optionally, may assign a PIN for the new tenant user for each shared EAC unit associated with the tenant user account (e.g., tenant-user account 104 of FIG. 1) (Block 312a). In accordance with certain embodiments, routine 300a may continue by enabling the owner-user to perform one or more steps within routine 300a to add one or more sites (e.g., secured locations) to a Site Access List for each EAC unit associated with the tenant user account(s) (Block 314a) and configure the tenant user account(s) as a "Shared User" for each shared EAC unit (Block 316a).

Figure 3B:
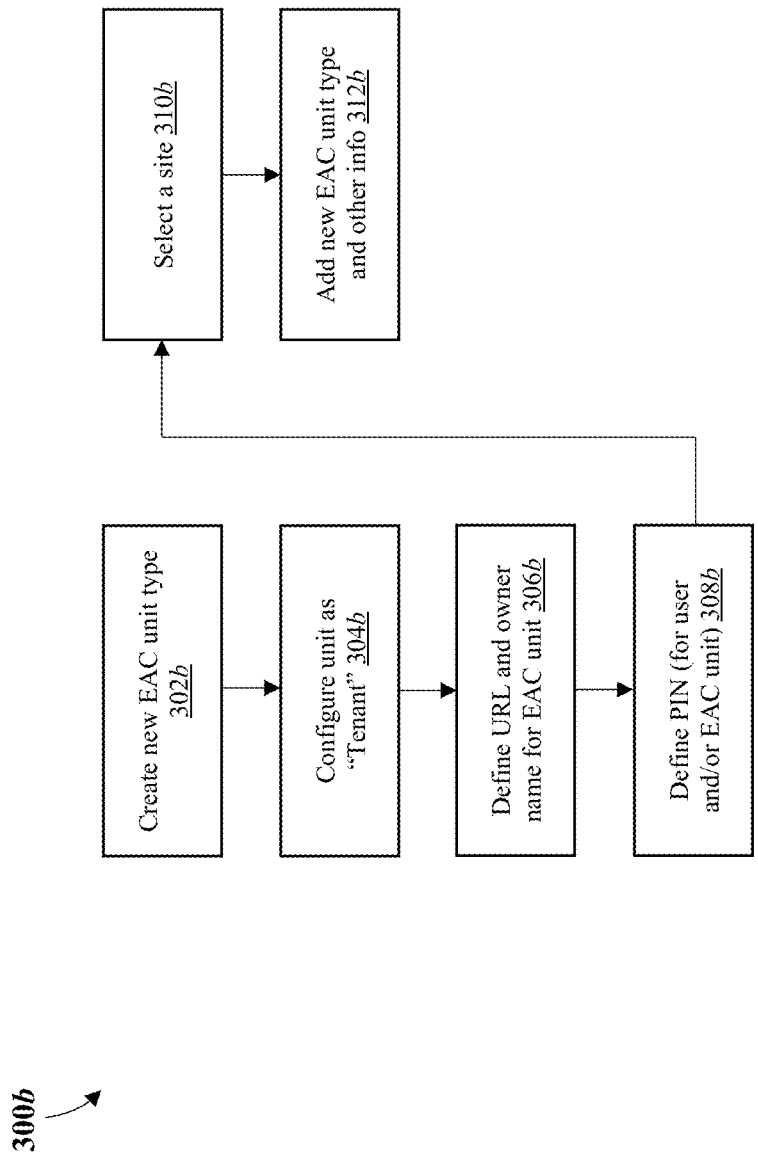
FIG. 3B is a functional block diagram of a routine of a shared omnibus access control system, in accordance with certain aspects of the present disclosure.

Referring now to FIG. 3B, with cross reference to FIG. 1, a functional block diagram of a routine 300b of a shared omnibus access control system is shown. In accordance with certain aspects of the present disclosure, routine 300b comprises one or more routine of system 100, as shown in FIG. 1. In accordance with certain aspects of the present disclosure, routine 300b may comprise one or more steps or operations to enable a tenant user to configure shared access provisioning for one or more shared EAC devices (e.g., electronic lock device 110 of FIG. 1) from a tenant-user account interface (e.g., tenant-user account 104 of FIG. 1). In accordance with certain aspects of the present disclosure, routine 300b may comprise one or more steps or operations to enable the tenant user to create a new EAC unit type from within the tenant user interface (e.g., GUI) (Block 302b). The tenant-user may perform one or more steps within routine 300a to configure a new EAC unit as a "Tenant" unit within the tenant-user account interface (Block 304b). Routine 300b may comprise one or more steps or operations for defining a URL and an owner name for each new EAC unit (Block 306b) and define a PIN for the tenant-user or its sub-users and/or for each new EAC unit (Block 308b). In accordance with certain aspects of the present disclosure, routine 300b may comprise one or more steps or operations to enable the tenant user to select a site for each new EAC unit (Block 310b) and add a new unit type and other information (e.g., authorized users, access credentials, access rules and the like) from within the tenant user interface (e.g., GUI) (Block 312b).

Figure 4:
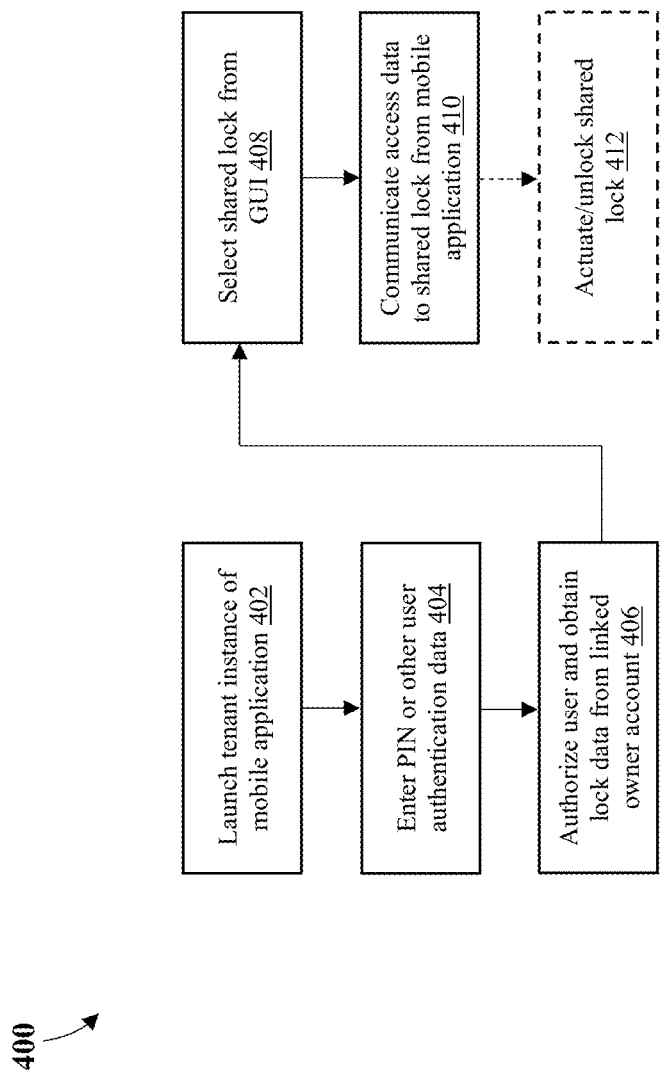
FIG. 4 is a functional block diagram of a routine of a shared omnibus access control system, in accordance with certain aspects of the present disclosure.

Referring now to FIG. 4, with cross reference to FIG. 1, a functional block diagram of a routine 400 of a shared omnibus access control system is shown. In accordance with certain aspects of the present disclosure, routine 400 comprises one or more routine of system 100, as shown in FIG. 1. In accordance with certain aspects of the present disclosure, routine 400 comprises one or more steps or operations for launching a tenant instance of an end user mobile application at a tenant-user device (Block 402). Routine 400 may continue by enabling the tenant user to perform one or more steps or operations within the GUI of the end user mobile application to enter a PIN or other user data for authenticating the tenant user (Block 404). Routine 400 may continue by performing one or more steps or operations for processing the PIN/user authentication data to authorize the user and obtain data for one or more shared locks via a data transfer interface between the tenant-user account and a linked owner account (Block 406). Routine 400 may continue by enabling the tenant user to perform one or more steps or operations within the GUI of the end user mobile application to select a shared lock from a list/menu of one or more shared locks (Step 408). Routine 400 may continue by performing one or more steps or operations for communicating access data (e.g., PIN, access code, etc.) from the mobile application to the selected shared lock; optionally, via a wireless data transfer interface (Block 410). Routine 400 may comprise one or more steps or operations for actuating/unlocking the shared lock in response to communicating the access data from the mobile application to the shared lock (Block 412). In certain embodiments, operations for actuating/unlocking the shared lock may take place at a processing device of the shared lock and may be executed outside of the scope of routine 400.

Figure 5:
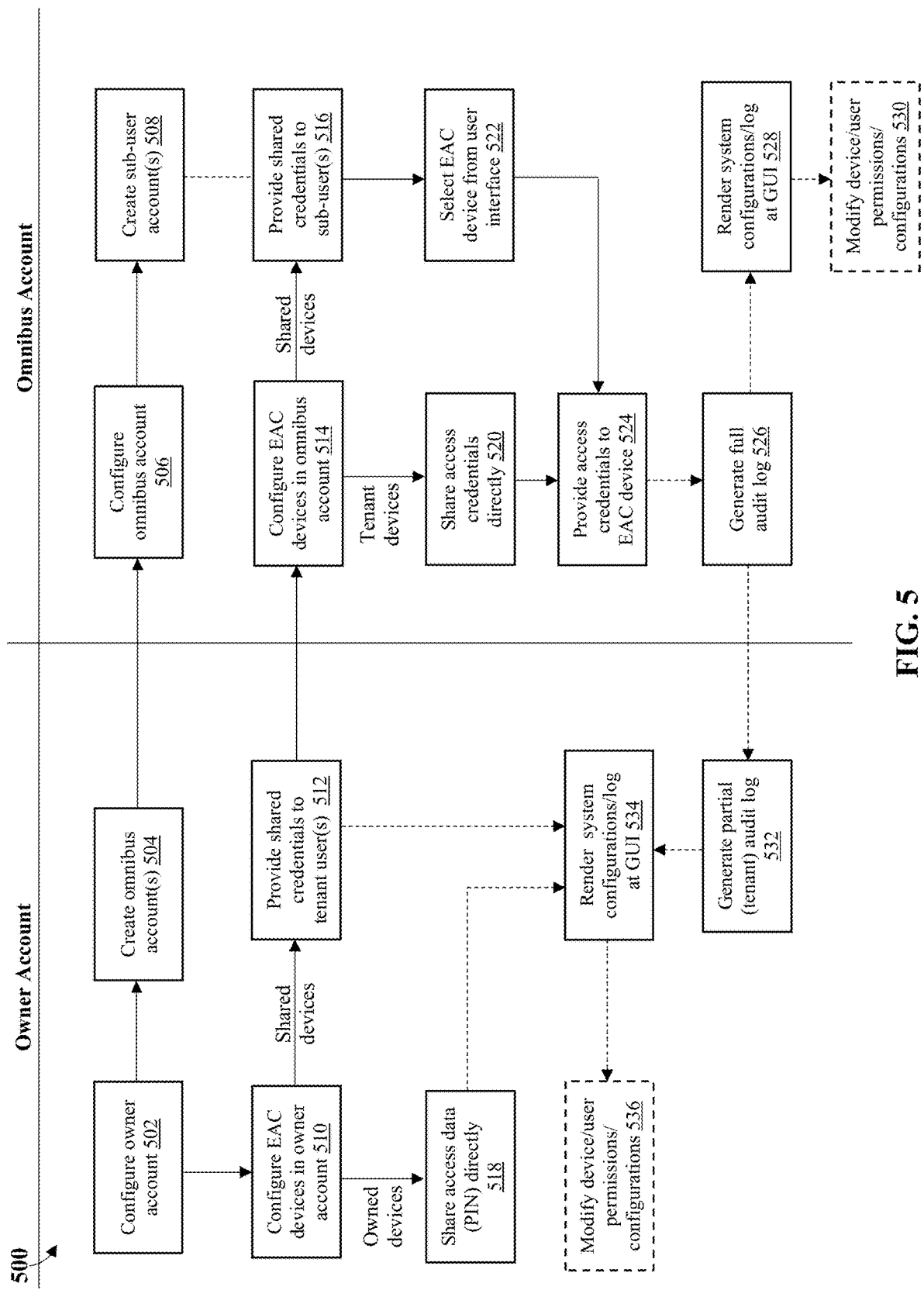
FIG. 5 is a functional block diagram of a routine of a shared omnibus access control system, in accordance with certain aspects of the present disclosure.

Referring now to FIG. 5, with cross reference to FIG. 1, a functional block diagram of a routine 500 of a shared omnibus access control system is shown. In accordance with certain aspects of the present disclosure, routine 500 comprises one or more routine of system 100, as shown in FIG. 1. In accordance with certain aspects of the present disclosure, routine 500 may comprise one or more operations of an owner account of the shared omnibus access control system (e.g., owner-user account 102 of FIG. 1) and an omnibus account of the shared omnibus access control system (e.g., tenant-user account 104 of FIG. 1). In accordance with certain aspects of the present disclosure, routine 500 may comprise one or more steps or operations to enable an owner user to configure one or more account settings with the owner account (Block 502). Routine 500 may enable the owner user to create one or more omnibus accounts for one or more tenant users within the owner account (Block 504). In accordance with certain embodiments, routine 500 may be configured to enable the owner user to share access to the omnibus account to the one or more tenant users. In certain embodiments, routine 500 may comprise one or more steps or operations to enable the tenant user to configure the omnibus account within a tenant user interface (Block 506). In accordance with certain embodiments, routine 500 may be configured to enable the tenant user to create one or more sub-users accounts (e.g., subtenant accounts 106 of FIG. 1) (Block 508).

In accordance with certain aspects of the present disclosure, routine 500 may comprise one or more steps or operations to enable the owner user to configure one or more EAC devices in the owner account (Block 510). In accordance with certain embodiments, the one or more EAC devices may be configured as "Shared Devices" or "Owned Devices." In accordance with certain embodiments, routine 500 may be configured to enable the owner user to provide credentials for the Shared Devices to the one or more tenant users via the user interface of the owner account (Block 512). For Owned Devices, routine 500 may be configured to enable the owner user to share access data directly with one or more other users (e.g., non-owner accounts 108 of FIG. 1) without providing shared credentials for the Owned Devices (Block 518). In accordance with certain aspects of the present disclosure, routine 500 may comprise one or more steps or operations to enable the tenant user to configure the one or more EAC devices in the omnibus account (Block 514). In accordance with certain embodiments, the one or more EAC devices may comprise the Shared Devices shared by the owner user and/or may comprise one or more Tenant Devices that are owned by the tenant and are not shared by the owner user. In accordance with certain aspects of the present disclosure, routine 500 may comprise one or more steps or operations to enable the tenant user to provide shared credentials to the one or more sub-users from the GUI of the omnibus account (Block 516). For Tenant Devices, routine 500 may be configured to enable the tenant user to share access data directly with one or more other users without providing shared credentials for the Tenant Devices (Block 520). In accordance with certain aspects of the present disclosure, routine 500 may comprise one or more steps or operations to enable the tenant user (and one or more sub-users) to select an EAC device for access within the GUI of the omnibus account (Block 522). Routine 500 may comprise one or more steps or operations for providing access credentials to the selected EAC device (e.g., via a wireless data transfer interface) (Block 524). The EAC device may receive and process the access credentials to grant or deny access to the user at the specified access point.

In accordance with certain aspects of the present disclosure, routine 500 may comprise one or more steps or operations to generate a full audit log comprising access data for the EAC devices and user identification data for user access to the EAC devices (Block 526). Routine 500 may comprise one or more steps or operations for rendering, at the graphical user interface of the omnibus account, an overview of the system configurations (e.g., locks, users, locations) for the omnibus account and/or the audit log for the access and user history for the omnibus account (Block 528). In accordance with certain embodiments, routine 500 may comprise one or more steps or operations to enable the tenant user to modify one or more devices settings, user permissions and/or account configurations for the omnibus account (Block 530). In accordance with certain aspects of the present disclosure, routine 500 may comprise one or more steps or operations for generating a partial audit log of access history data associated with the omnibus account (Block 532). In accordance with certain embodiments, the partial audit log contains only access events (e.g., times and dates of access at which devices) for the Shared Devices and does not contain user-identifiable information for the tenant users or sub-users. Routine 500 may comprise one or more steps or operations for rendering, at the graphical user interface of the owner account, an overview of the system configurations (e.g., locks, users, locations) for the owner account (including shared account configurations) and/or the audit log for the access and user history for the owner account (including the partial audit log) (Block 534). In accordance with certain embodiments, routine 500 may comprise one or more steps or operations to enable the owner user to modify one or more device settings, user permissions and/or account configurations for the omnibus account (Block 536).

Figure 6:
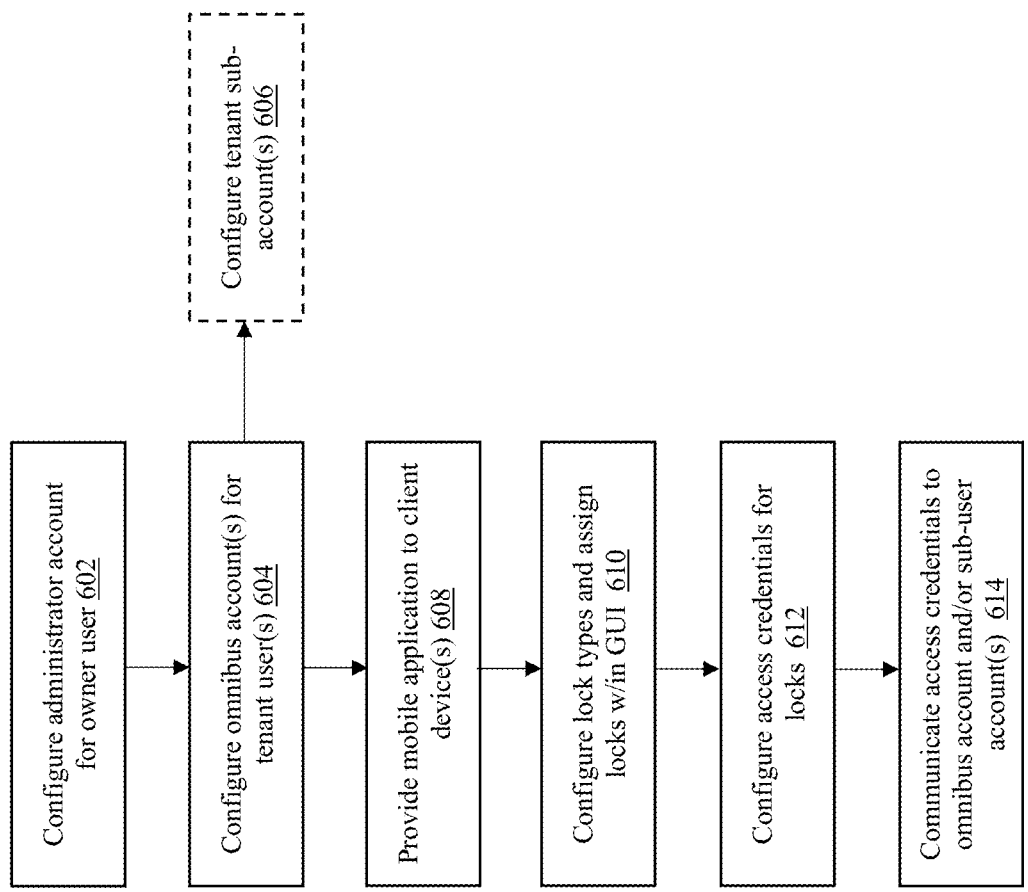
FIG. 6 is a process flow diagram of a routine of a shared omnibus access control method, in accordance with certain aspects of the present disclosure.

Referring now to FIG. 6, with cross reference to FIG. 1, a process flow diagram of a shared omnibus access control method 600 is shown. In accordance with certain aspects of the present disclosure, method 600 may be executed on one or more system components of system 100, as shown in FIG. 1. In accordance with certain aspects of the present disclosure, method 600 may be initiated by performing one or more steps or operations for configuring (e.g., with EAC server 114 of FIG. 1) an administrator account for an owner-user account (e.g., owner-user account 102 of FIG. 1) (Block 602). In accordance with certain embodiments, the administrator account is configured to enable the owner user to selectively revoke electronic access rights and one or more permissions for a tenant user account (e.g., tenant-user account 104 of FIG. 1) and one or more sub-user accounts. Method 600 may continue by performing one or more steps or operations for configuring (e.g., with EAC server 114 of FIG. 1) an omnibus account (e.g., tenant-user account 104 of FIG. 1) for the tenant user (Block 604). In accordance with certain embodiments, the omnibus account is configured to enable the tenant user to create one or more sub-user accounts (e.g., sub-tenant accounts 106 of FIG. 1) within the omnibus account (Block 606). Method 600 may continue by performing one or more steps or operations for providing (e.g., with EAC server 114 of FIG. 1) a mobile application to at least one client device (Block 608). In accordance with certain embodiments, the mobile application comprises a graphical user interface for configuring one or more settings of the omnibus account or the administrator account. Method 600 may continue by performing one or more steps or operations for configuring, (e.g., with at least one client device via the graphical user interface) one or more lock types for one or more electronic access control devices (e.g., electronic lock device 110 of FIG. 1) (Block 610). In accordance with certain aspects of the present disclosure, method 600 may continue by performing one or more steps or operations for configuring, (e.g., with the at least one client device via the graphical user interface) one or more access credentials for the one or more electronic access control devices (Block 612). In accordance with certain aspects of the present disclosure, method 600 may proceed by performing one or more steps or operations for communicating (e.g., with the at least one server) the one or more access credentials to the omnibus account or the one or more sub-user accounts (Block 614).

In accordance with certain aspects of the present disclosure, method 600 may include one or more additional steps or sub-steps in addition to steps 602-614. In accordance with certain embodiments, method 600 may further comprise one or more steps or operations for configuring (e.g., with the at least one server) a first audit log for the tenant user. In accordance with certain embodiments, the first audit log may comprise access history data and user information data associated with the omnibus account. In accordance with certain embodiments, method 600 may further comprise one or more steps or operations for configuring (e.g., with the at least one server), a second audit log for the owner user. In accordance with certain embodiments, the second audit log may comprise only the access history data associated with the omnibus account. In accordance with certain embodiments, method 600 may further comprise one or more steps or operations for assigning (e.g., with the at least one server) a uniform resource locator to each electronic access control device in the one or more electronic access control devices. In accordance with certain embodiments, method 600 may further comprise one or more steps or operations for configuring (e.g., with the at least one client device via the omnibus account) temporary access rights for the one or more electronic access control devices to one or more guest users. In accordance with certain embodiments, method 600 may further comprise one or more steps or operations for selectively revoking (e.g., with the at least one client device via the owner account) one or more access rights for the one or more electronic access control devices for the tenant user. In accordance with certain embodiments, method 600 may further comprise one or more steps or operations for configuring (e.g., with at least one server) two or more omnibus accounts for two or more tenant users. In accordance with certain embodiments, method 600 may further comprise one or more steps or operations for configuring (e.g., with at least one server) an access code or pin for accessing the one or more electronic access control devices for each tenant user in the two or more tenant users.

Figure 7:
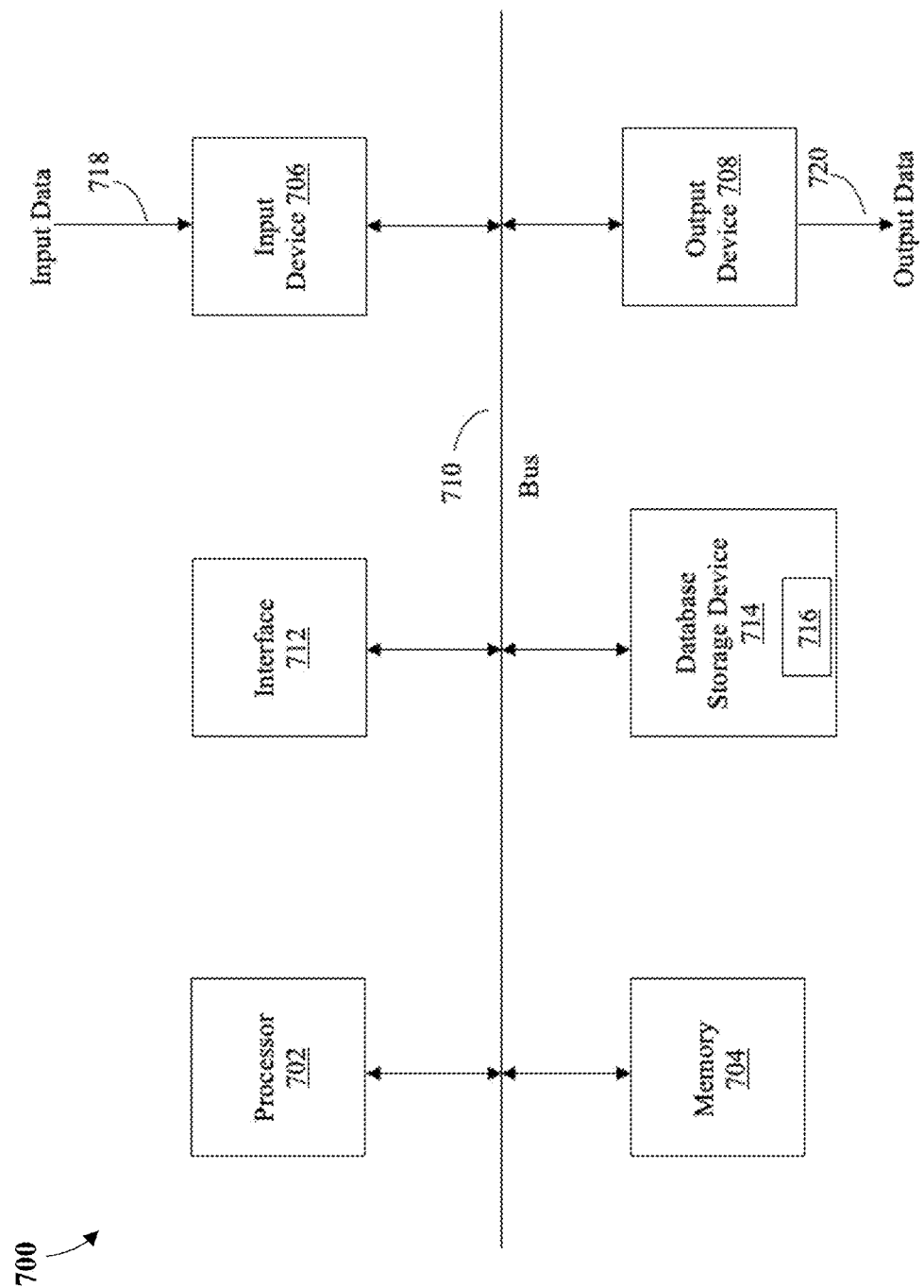
FIG. 7 is a block diagram of a computing device through which one or more aspects of the present disclosure may be implemented.

Referring now to FIG. 7, a processor-implemented computing device in which one or more aspects of the present disclosure may be implemented is shown. According to an embodiment, a processing system 700 may generally comprise at least one processor 702, or a processing unit or plurality of processors, memory 704, at least one input device 706 and at least one output device 708, coupled together via a bus or a group of buses 710. In certain embodiments, input device 706 and output device 708 could be the same device. An interface 712 can also be provided for coupling the processing system 700 to one or more peripheral devices, for example interface 712 could be a PCI card or a PC card. At least one storage device 714 which houses at least one database 716 can also be provided. The memory 704 can be any form of memory device, for example, volatile or non-volatile memory, solid state storage devices, magnetic devices, etc. The processor 702 can comprise more than one distinct processing device, for example to handle different functions within the processing system 700. Input device 706 receives input data 718 and can comprise, for example, a keyboard, a pointer device such as a pen-like device or a mouse, audio receiving device for voice-controlled activation such as a microphone, data receiver or antenna such as a modem or a wireless data adaptor, a data acquisition card, etc. Input data 718 can come from different sources, for example keyboard instructions in conjunction with data received via a network. Output device 708 produces or generates output data 720 and can comprise, for example, a display device or monitor in which case output data 720 is visual, a printer in which case output data 720 is printed, a port, such as for example a USB port, a peripheral component adaptor, a data transmitter or antenna such as a modem or wireless network adaptor, etc. Output data 720 can be distinct and/or derived from different output devices, for example a visual display on a monitor in conjunction with data transmitted to a network. A user could view data output, or an interpretation of the data output, on, for example, a monitor or using a printer. The storage device 714 can be any form of data or information storage means, for example, volatile or non-volatile memory, solid state storage devices, magnetic devices, etc.

In use, the processing system 700 is adapted to allow data or information to be stored in and/or retrieved from, via wired or wireless communication means, at least one database 716. The interface 712 may allow wired and/or wireless communication between the processing unit 702 and peripheral components that may serve a specialized purpose. In general, the processor 702 can receive instructions as input data 718 via input device 706 and can display processed results or other output to a user by utilizing output device 708. More than one input device 706 and/or output device 708 can be provided. It should be appreciated that the processing system 700 may be any form of terminal, server, specialized hardware, or the like.

It is to be appreciated that the processing system 700 may be a part of a networked communications system. Processing system 700 could connect to a network, for example the Internet or a WAN. Input data 718 and output data 720 can be communicated to other devices via the network. The transfer of information and/or data over the network can be achieved using wired communications means or wireless communications means. A server can facilitate the transfer of data between the network and one or more databases. A server and one or more database(s) provide an example of a suitable information source.

Thus, the processing computing system environment 700 illustrated in FIG. 7 may operate in a networked environment using logical connections to one or more remote computers. In embodiments, the remote computer may be a personal computer, a server, a router, a network PC, a peer device, or other common network node, and typically includes many or all of the elements described above.

It is to be further appreciated that the logical connections depicted in FIG. 7 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 700 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 700, or portions thereof, may be stored in a remote memory storage device. It is to be appreciated that the illustrated network connections of FIG. 7 are exemplary and other means of establishing a communications link between multiple computers may be used.

FIG. 7 is intended to provide a brief, general description of an illustrative and/or suitable exemplary environment in which embodiments of the invention may be implemented. That is, FIG. 7 is but an example of a suitable environment and is not intended to suggest any limitations as to the structure, scope of use, or functionality of embodiments of the present invention exemplified therein. A particular environment should not be interpreted as having any dependency or requirement relating to any one or a specific combination of components illustrated in an exemplified operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 700 of FIG. 7. As such, it will be understood that such acts and operations, which are at times referred to as being computer-executed, include the manipulation by the processor of the computer of electrical signals representing data in a structured form. This manipulation transforms data or maintains it at locations in the memory system of the computer, which reconfigures or otherwise alters the operation of the computer in a manner that is conventionally understood by those skilled in the art. The data structures in which data is maintained are physical locations of the memory that have particular properties defined by the format of the data. However, while certain embodiments may be described in the foregoing context, the scope of the disclosure is not meant to be limiting thereto, as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with embodiments of the invention include, but are not limited to, personal computers, handheld or laptop devices, personal digital assistants, multiprocessor systems, microprocessor-based systems, set top boxes, programmable consumer electronics, networks, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

With the exemplary computing system environment 700 of FIG. 7 being generally shown and discussed above, description will now turn towards illustrated embodiments of the present invention which generally relate to systems and methods for enabling a shared omnibus electronic access control system for an owner user and one or more tenant users. It is to be understood and appreciated that certain aspects of the methods described herein comprise configuring an omnibus account for a tenant user, wherein the omnibus account is configured to enable the tenant user to create one or more sub-user accounts within the omnibus account; configuring an administrator account for an owner user, wherein the administrator account is configured to enable the owner user to selectively revoke access rights and one or more permissions for the tenant user and the one or more sub-user accounts; configuring a first audit log for the tenant user, wherein the first audit log comprises access history data and user information data associated with the omnibus account; and configuring a second audit log for the owner user, wherein the second audit log comprises only the access history data associated with the omnibus account.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrases are used herein, a processor may be "operable to" or "configured to" perform a certain function in a variety of ways, including, for example, by having one or more general-purpose circuits perform the function by executing particular computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor but may be distributed in a modular fashion amongst a number of different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom," "upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. An electronic access control system comprising:
at least one server comprising at least one processor and a non-transitory computer-readable medium comprising executable computer program instructions stored thereon that, when executed, command the at least one processor to perform one or more operations, the one or more operations comprising:
configuring a first account for a first user, wherein the first account is configured to enable the first user to create one or more sub-user accounts within the first account;
configuring a second account for a second user, wherein the second account is configured to enable the second user to selectively configure one or more electronic access control permissions for one or more electronic access control devices for the first account and the one or more sub-user accounts;
configuring a first audit log for the first user, wherein the first audit log comprises electronic access control data associated with the first account,
wherein the electronic access control data associated with the first account comprises access history data and user information data associated with the first account; and
configuring a second audit log for the second user, wherein the second audit log comprises a subset of the electronic access control data associated with the first account,
wherein the subset of the electronic access control data associated with the first account comprises only the access history data associated with the first account.

2. The electronic access control system of claim 1 wherein the first account is configured to enable the first user to temporarily grant access rights for the one or more electronic access control devices to one or more guest users.

3. The electronic access control system of claim 1 wherein the second account is configured to enable the second user to configure two or more lock types for the one or more electronic access control devices.

4. The electronic access control system of claim 3 wherein the two or more lock types comprise owned locks and shared locks.

5. The electronic access control system of claim 4 wherein the first account is configured to enable the first user to selectively grant access permissions to the shared locks to the one or more sub-user accounts.

6. The electronic access control system of claim 4 wherein the second account is configured to enable the second user to selectively grant access permissions to the owned locks to the first account and the one or more sub-user accounts without providing shared credentials for the owned locks.

7. The electronic access control system of claim 1 wherein the second account is configured to enable the second user to selectively revoke access rights to the one or more electronic access control devices for the first account and the one or more sub-user accounts.

8. An electronic access control method comprising:
configuring, with at least one server, a first account for a first user, wherein the first account is configured to enable the first user to create one or more sub-user accounts within the first account;
configuring, with the at least one server, a second account for a second user, wherein the second account is configured to enable the second user to selectively configure one or more electronic access control permissions for one or more electronic access control devices for the first account and the one or more sub-user accounts;
configuring, with the at least one server, two or more lock types for the one or more electronic access control devices, wherein the two or more lock types comprise owned locks and shared locks;
configuring, with the second account, one or more access credentials for the one or more electronic access control devices;
communicating, with the at least one server, the one or more access credentials for the one or more electronic access control devices to the first account or the one or more sub-user accounts; and
selectively granting, via the second account, access permissions for the owned locks to the first account and the one or more sub-user accounts without providing shared credentials for the owned locks.

9. The electronic access control method of claim 8 further comprising configuring, with the at least one server, a first audit log for the first user.

10. The electronic access control method of claim 9 wherein the first audit log comprises access history data and user information data associated with the first account.

11. The electronic access control method of claim 10 further comprising configuring, with the at least one server, a second audit log for the second user.

12. The electronic access control method of claim 11 wherein the second audit log comprises only the access history data associated with the first account.

13. The electronic access control method of claim 8 further comprising configuring, via the first account, temporary access rights for the one or more electronic access control devices to one or more guest users.

14. The electronic access control method of claim 8 further comprising selectively revoking, via the second account, one or more access rights for the one or more electronic access control devices for the first user.

15. The electronic access control method of claim 8 further comprising selectively granting, via the first account, access permissions for the shared locks to the one or more sub-user accounts.

16. A non-transitory computer-readable medium comprising executable computer program instructions stored thereon that, when executed, command at least one processor to perform one or more operations of an electronic access control method, the one or more operations comprising:
configuring a first account for a first user, wherein the first account is configured to enable the first user to create one or more sub-user accounts within the first account;
configuring a second account for a second user, wherein the second account is configured to enable the second user to selectively configure one or more electronic access control permissions for one or more electronic access control devices for the first account and the one or more sub-user accounts;
configuring a first audit log for the first user, wherein the first audit log comprises electronic access control data associated with the first account,
wherein the electronic access control data associated with the first account comprises access history data and user information data associated with the first account; and
configuring a second audit log for the second user, wherein the second audit log comprises a subset of the electronic access control data associated with the first account,
wherein the subset of the electronic access control data associated with the first account comprises only the access history data associated with the first account.

17. The electronic access control system of claim 1 wherein the one or more operations further comprise providing a mobile application with a graphical user interface configured to permit configuration of settings of the first account and the second account.

18. The electronic access control system of claim 1 wherein the one or more operations further comprise assigning a uniform resource locator to each electronic access control device of the one or more electronic access control devices.

19. The electronic access control method of claim 8 further comprising assigning, with the at least one server, a uniform resource locator to each electronic access control device of the one or more electronic access control devices.

20. The electronic access control method of claim 8 further comprising generating, with the at least one server, a registration identifier and download instructions and sending the registration identifier and the download instructions to a user device.

* * * * *